(12) United States Patent
Lee et al.

(10) Patent No.: US 8,374,423 B2
(45) Date of Patent: Feb. 12, 2013

(54) MOTION DETECTION USING DEPTH IMAGES

(75) Inventors: Johnny Lee, Bellevue, WA (US); Tommer Leyvand, Seattle, WA (US); Craig Peeper, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 13/410,546

(22) Filed: Mar. 2, 2012

(65) Prior Publication Data
US 2012/0177254 A1 Jul. 12, 2012

Related U.S. Application Data

(63) Continuation of application No. 12/641,788, filed on Dec. 18, 2009, now abandoned.

(51) Int. Cl.
*G06K 9/00* (2006.01)

(52) U.S. Cl. .................... 382/154; 382/103

(58) Field of Classification Search .......... None
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |
| 5,101,444 A | 3/1992 | Wilson et al. | |
| 5,148,154 A | 9/1992 | MacKay et al. | |
| 5,184,295 A | 2/1993 | Mann | |

(Continued)

FOREIGN PATENT DOCUMENTS

| | | |
|---|---|---|
| CN | 101254344 B | 6/2010 |
| EP | 0583061 A2 | 2/1994 |

(Continued)

OTHER PUBLICATIONS

Stevens, "Flights into Virtual Reality Treating Real World Disorders", The Washington Post, Mar. 27, 1995, Science Psychology, 2 pages.

(Continued)

*Primary Examiner* — Claire X Wang
(74) *Attorney, Agent, or Firm* — Vierra Magen Marcus & DeNiro LLP

(57) ABSTRACT

A sensor system creates a sequence of depth images that are used to detect and track motion of objects within range of the sensor system. A reference image is created and updated based on a moving average (or other function) of a set of depth images. A new depth images is compared to the reference image to create a motion image, which is an image file (or other data structure) with data representing motion. The new depth image is also used to update the reference image. The data in the motion image is grouped and associated with one or more objects being tracked. The tracking of the objects is updated by the grouped data in the motion image. The new positions of the objects are used to update an application.

20 Claims, 11 Drawing Sheets

U.S. PATENT DOCUMENTS

| | | | |
|---|---|---|---|
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,912,700 A | 6/1999 | Honey |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,133,946 A | 10/2000 | Cavallaro |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 * | 7/2001 | Nguyen ..................... 715/863 |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,512,838 B1 | 1/2003 | Rafii |
| 6,539,931 B2 | 4/2003 | Trajkovic |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,658,136 B1 | 12/2003 | Brumitt |
| 6,661,918 B1 | 12/2003 | Gordon et al. |
| 6,674,877 B1 | 1/2004 | Jojic |
| 6,681,031 B2 | 1/2004 | Cohen et al. |
| 6,714,665 B1 | 3/2004 | Hanna et al. |
| 6,728,637 B2 | 4/2004 | Ford |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen |
| 7,003,134 B1 | 2/2006 | Covell et al. |
| 7,003,136 B1 | 2/2006 | Harville |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,075,556 B1 | 7/2006 | Meier |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth |
| 7,259,747 B2 | 8/2007 | Bell |
| 7,308,112 B2 | 12/2007 | Fujimura |
| 7,317,836 B2 | 1/2008 | Fujimura |
| 7,348,963 B2 | 3/2008 | Bell |
| 7,359,121 B2 | 4/2008 | French et al. |
| 7,366,325 B2 | 4/2008 | Fujimura |
| 7,367,887 B2 | 5/2008 | Watabe |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |

| | | | |
|---|---|---|---|
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2003/0219146 | A1* | 11/2003 | Jepson et al. ............ 382/103 |
| 2005/0058337 | A1 | 3/2005 | Fujimura |
| 2005/0190972 | A1 | 9/2005 | Thomas |
| 2007/0110298 | A1* | 5/2007 | Graepel et al. ............ 382/154 |
| 2008/0026838 | A1 | 1/2008 | Dunstan et al. |
| 2008/0152191 | A1 | 6/2008 | Fujimura |
| 2008/0166045 | A1 | 7/2008 | Xu |
| 2009/0141933 | A1 | 6/2009 | Wagg |
| 2009/0175540 | A1 | 7/2009 | Dariush |
| 2009/0221368 | A1 | 9/2009 | Yen |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | WO2009059065 | 5/2009 |

OTHER PUBLICATIONS

Aggarwal, "Human Motion Analysis: A Review," Published Date: 1999 http://citeseerx.ist.psu.edu/viewdoc/download?doi=10.1.1.50.6195&rep=rep1&type=pdf.

Rybski, "Cameo: Camera Assisted Meeting Event Observer," Published Date: Apr. 2004 http://www.cs.cmu.edu/~mmv/papers/04icra-cameo.pdf.

Kam, "A Real-time 3D Motion Tracking System," Published Date: 1990 https://circle.ubc.ca/bitstream/2429/2545/3/ubc__1993__spring__kam__johnny.pdf.

Micilotta, "The Tracking of Hands for the Development of a Gesture Recognition Algorithm," Published Date: Oct. 18, 2000, http://www.amicilotta.airpost.net/documents/micilotta_undergrad_dissertation.pdf.

Qian, et al., "A Gesture-Driven Multimodal Interactive Dance System," 2004 IEEE International Conference on Multimedia and Expo (ICME), 2004, pp. 1579-1582.

Shivappa, et al., "Person Tracking With Audio-visual Cues Using the Iterative Decoding Framework," IEEE 5th International Conference on Advanced Video and Signal Based Surveillance, 2008, pp. 260-267.

Toyama, et al., "Probabilistic Tracking in a Metric Space," Eighth International Conference on Computer Vision, Vancouver, Canada, vol. 2, Jul. 2001, 8 pages.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "CONDENSATION—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

"Simulation and Training", 1994, Division Incorporated.

English Machine-translation of Japanese Publication No. JP08-044490 published on Feb. 16, 1996.

* cited by examiner

FIG. 6

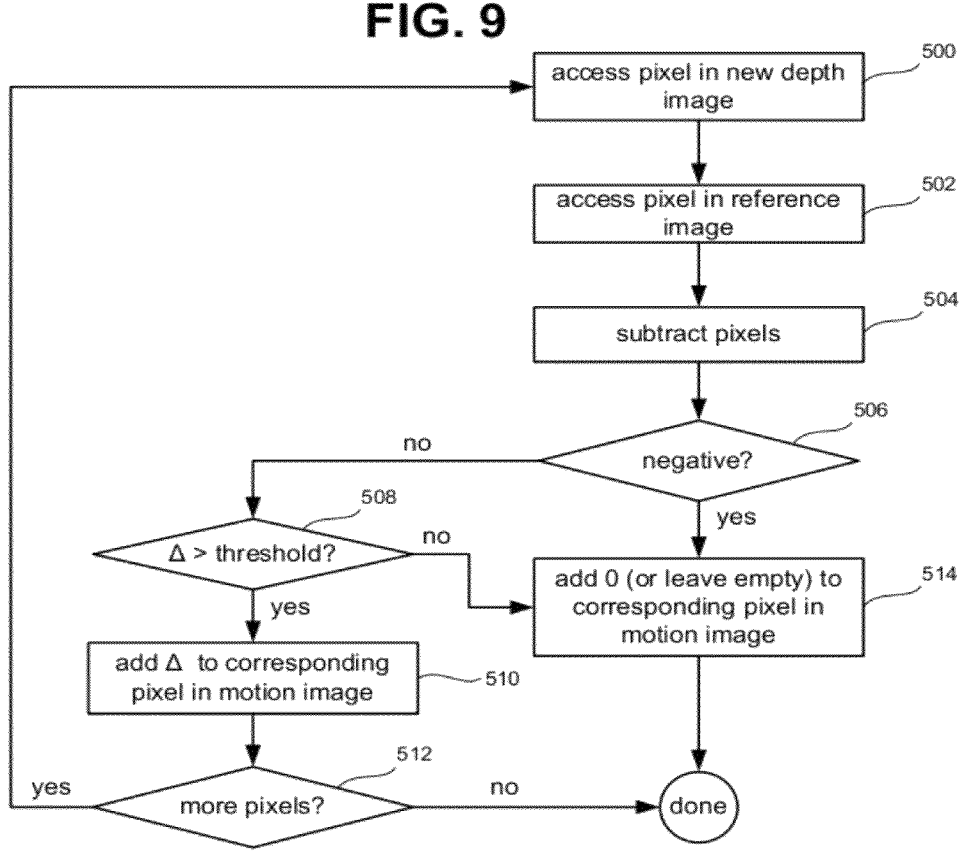

MOTION DETECTION USING DEPTH IMAGES

CLAIM OF PRIORITY

This application is a continuation application of U.S. application Ser. No. 12/641,788, "MOTION DETECTION USING DEPTH IMAGES," filed on Dec. 18, 2009, which is incorporated herein by reference in its entirety.

BACKGROUND

Many computing applications such as computer games, multimedia applications, or the like use controls to allow users to manipulate game characters or other aspects of an application. Typically such controls are input using, for example, controllers, remotes, keyboards, mice, or the like. Unfortunately, such controls can be difficult to learn, thus creating a barrier between a user and such games and applications. Furthermore, such controls may be different than actual game actions or other application actions for which the controls are used. For example, a game control that causes a game character to swing a baseball bat may not correspond to an actual motion of swinging the baseball bat.

SUMMARY

Disclosed herein are systems and methods for tracking motion of a user or other objects in a scene using depth images. The tracked motion is then used to update an application. Therefore, a user can manipulate game characters or other aspects of the application by using movement of the user's body and/or objects around the user, rather than (or in addition to) using controllers, remotes, keyboards, mice, or the like.

A sensor system creates a sequence of depth images that are used to detect and track motion of objects within range of the sensor system. A reference image is created and updated based on a moving average (or other function) of a set of depth images. A new depth images is compared to the reference image to create a motion image, which is an image file (or other data structure) with data representing motion. The new depth image is also used to update the reference image. The data in the motion image is grouped and associated with one or more objects being tracked. The tracking of the objects is updated by the grouped data in the motion image. The new positions of the objects are used to update an application. For example, a video game system will update the position of images displayed in the video based on the new positions of the objects. In one implementation, avatars can be moved based on movement of the user in front of a camera.

One embodiment includes creating a reference image that includes foreground data and background data based on multiple previous depth images, receiving a new depth image, creating a motion image based on the new depth image and the reference image, identifying one or more objects in the motion image, using position information for the identified one or more objects to update an application, and updating the reference image based on the new depth image.

One embodiment includes a communication interface that receives depth images, one or more storage devices that store depth images, a display interface, and one or more processors in communication with the one or more storage devices and the display interface. The one or more processors access a new depth image received from the communication interface and identify motion based comparing the new depth image to a reference image stored in the one or more storage devices. The one or more processors create a motion image representing identified motion. The one or more processors group pixels of the motion image and associate one or more groups of pixels with one or more objects identified in object history data stored in the one or more storage devices. The one or more processors use position information for the identified one or more objects to update an application running on the apparatus and provide signals on the display interface that indicate the update to the application.

One embodiment includes receiving a new depth image, identifying motion based on comparing the new depth image to a reference image, creating a motion image representing identified forward motion and discarding identified backward motion when creating the motion image, identifying one or more objects in the motion image, and reporting the identified one or more objects in the motion image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 depicts the data in a depth image.

FIG. 9 is a flow chart describing one embodiment of a process for creating a motion image based on a depth image and a reference image.

DETAILED DESCRIPTION

Depth images are captured by a sensor and used by a computing system to track motions of a user and/or other objects. The tracked motion is then used to update an application. Therefore, a user can manipulate game characters or other aspects of the application by using movement of the user's body and/or objects around the user, rather than (or in addition to) using controllers, remotes, keyboards, mice, or the like. For example, a video game system will update the position of images displayed in the video based on the new positions of the objects or update an avatar based on motion of the user.

Figure 1A:
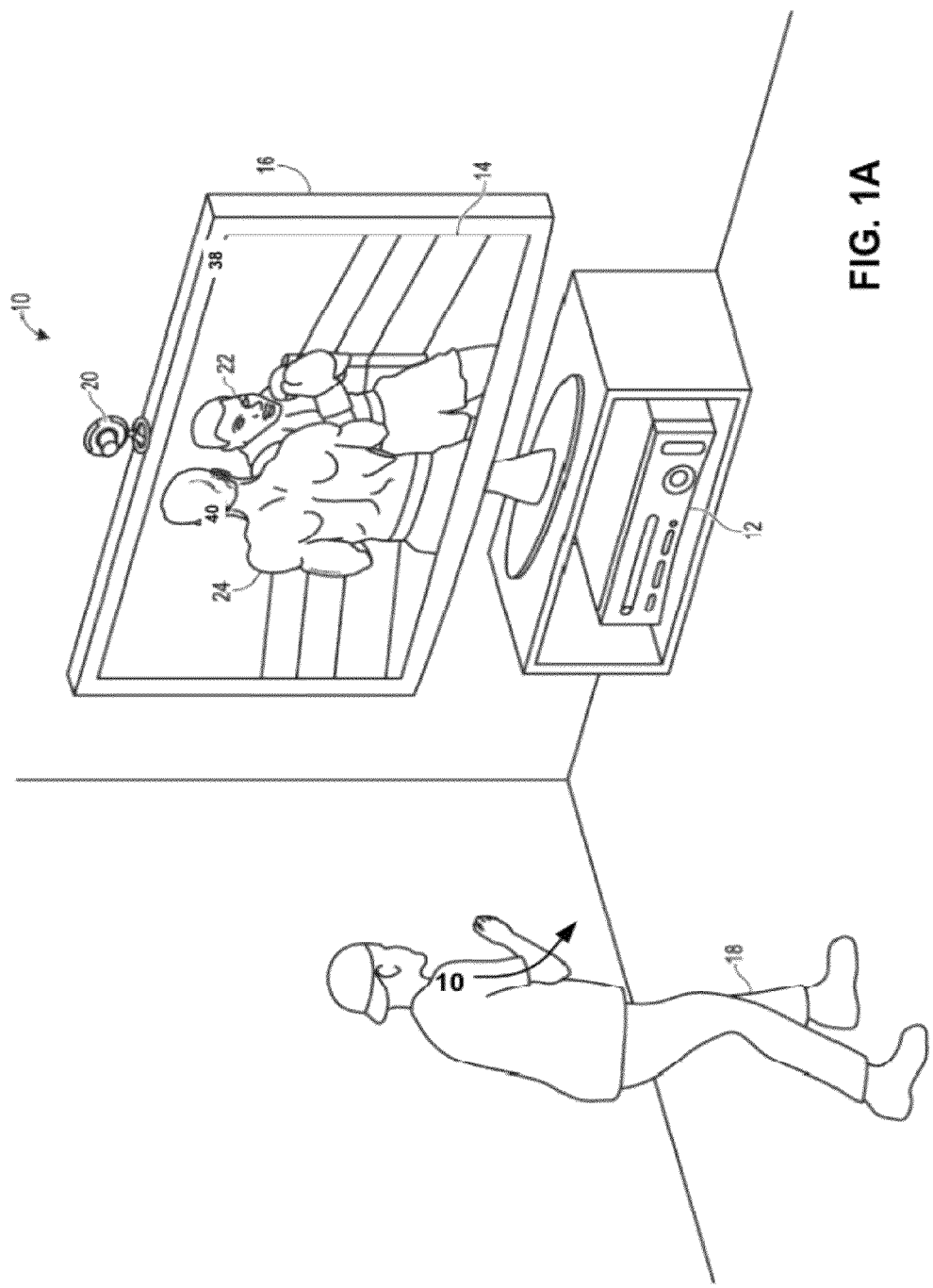
FIGS. 1A and 1B illustrate an example embodiment of a tracking system with a user playing a game.
Figure 1B:
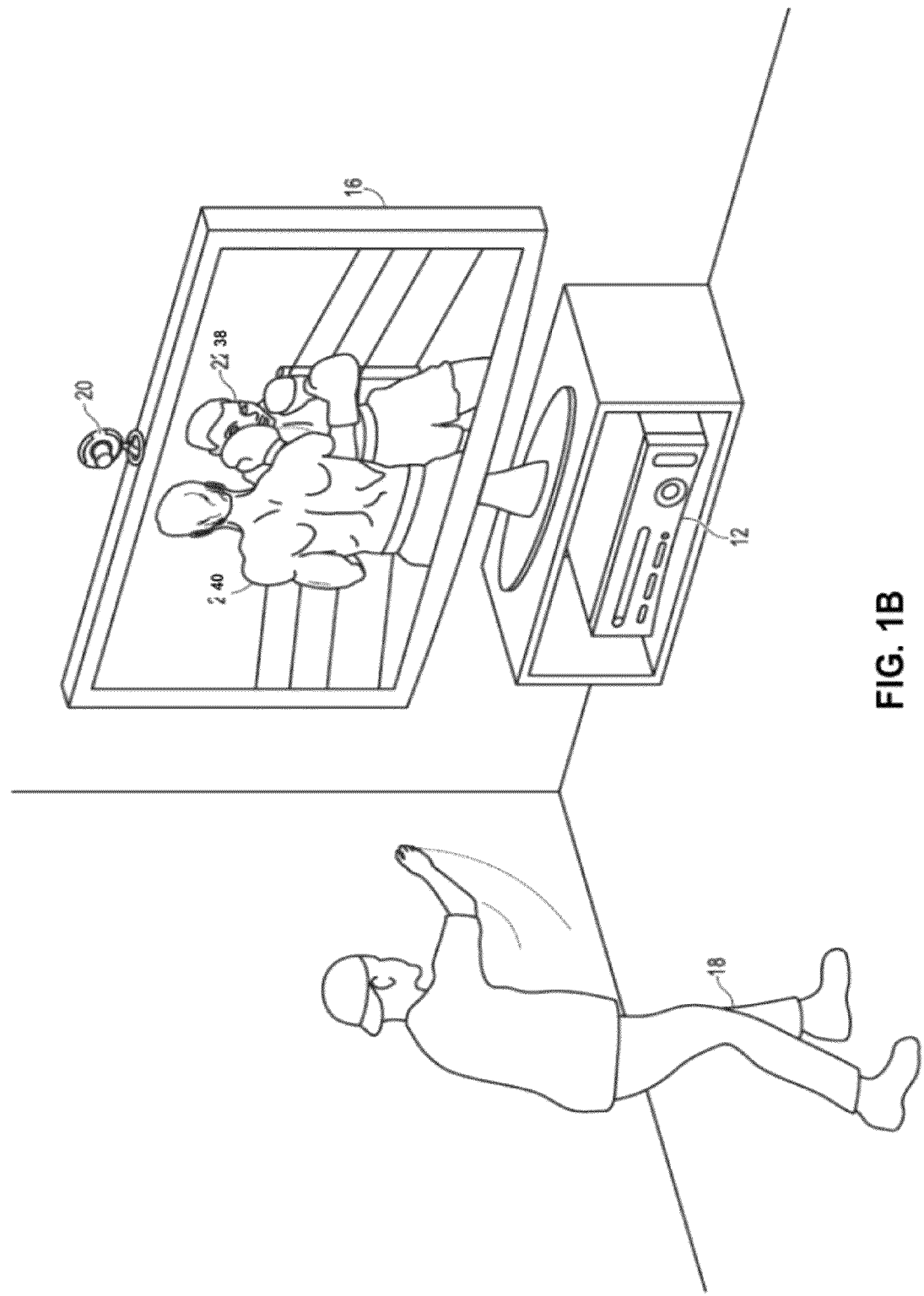

FIGS. 1A and 1B illustrate an example embodiment of a tracking system 10 with a user 18 playing a boxing video game. In an example embodiment, the tracking system 10 may be used to recognize, analyze, and/or track a human target such as the user 18 or other objects within range of tracking system 10.

As shown in FIG. 1A, tracking system 10 may include a computing system 12. The computing system 12 may be a computer, a gaming system or console, or the like. According to an example embodiment, the computing system 12 may include hardware components and/or software components such that computing system 12 may be used to execute applications such as gaming applications, non-gaming applications, or the like. In one embodiment, computing system 12 may include a processor such as a standardized processor, a specialized processor, a microprocessor, or the like that may execute instructions stored on a processor readable storage device for performing the processes described herein.

As shown in FIG. 1A, tracking system 10 may further include a capture device 20. The capture device 20 may be, for example, a camera that may be used to visually monitor one or more users, such as the user 18, such that gestures and/or movements performed by the one or more users may be captured, analyzed, and tracked to perform one or more controls or actions within the application and/or animate an avatar or on-screen character, as will be described in more detail below.

According to one embodiment, the tracking system 10 may be connected to an audiovisual device 16 such as a television, a monitor, a high-definition television (HDTV), or the like that may provide game or application visuals and/or audio to a user such as the user 18. For example, the computing system 12 may include a video adapter such as a graphics card and/or an audio adapter such as a sound card that may provide audiovisual signals associated with the game application, non-game application, or the like. The audiovisual device 16 may receive the audiovisual signals from the computing system 12 and may then output the game or application visuals and/or audio associated with the audiovisual signals to the user 18. According to one embodiment, the audiovisual device 16 may be connected to the computing system 12 via, for example, an S-Video cable, a coaxial cable, an HDMI cable, a DVI cable, a VGA cable, component video cable, or the like.

As shown in FIGS. 1A and 1B, the tracking system 10 may be used to recognize, analyze, and/or track a human target such as the user 18. For example, the user 18 may be tracked using the capture device 20 such that the gestures and/or movements of user 18 may be captured to animate an avatar or on-screen character and/or may be interpreted as controls that may be used to affect the application being executed by computer environment 12. Thus, according to one embodiment, the user 18 may move his or her body to control the application and/or animate the avatar or on-screen character.

In the example depicted in FIGS. 1A and 1B, the application executing on the computing system 12 may be a boxing game that the user 18 is playing. For example, the computing system 12 may use the audiovisual device 16 to provide a visual representation of a boxing opponent 38 to the user 18. The computing system 12 may also use the audiovisual device 16 to provide a visual representation of a player avatar 40 that the user 18 may control with his or her movements. For example, as shown in FIG. 1B, the user 18 may throw a punch in physical space to cause the player avatar 40 to throw a punch in game space. Thus, according to an example embodiment, the computer system 12 and the capture device 20 recognize and analyze the punch of the user 18 in physical space such that the punch may be interpreted as a game control of the player avatar 40 in game space and/or the motion of the punch may be used to animate the player avatar 40 in game space.

Other movements by the user 18 may also be interpreted as other controls or actions and/or used to animate the player avatar, such as controls to bob, weave, shuffle, block, jab, or throw a variety of different power punches. Furthermore, some movements may be interpreted as controls that may correspond to actions other than controlling the player avatar 40. For example, in one embodiment, the player may use movements to end, pause, or save a game, select a level, view high scores, communicate with a friend, etc. According to another embodiment, the player may use movements to select the game or other application from a main user interface. Thus, in example embodiments, a full range of motion of the user 18 may be available, used, and analyzed in any suitable manner to interact with an application.

In example embodiments, the human target such as the user 18 may have an object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game. Objects not held by the user can also be tracked, such as objects thrown, pushed or rolled by the user (or a different user) as well as self propelled objects. In addition to boxing, other games can also be implemented.

According to other example embodiments, the tracking system 10 may further be used to interpret target movements as operating system and/or application controls that are outside the realm of games. For example, virtually any controllable aspect of an operating system and/or application may be controlled by movements of the target such as the user 18.

Figure 2:
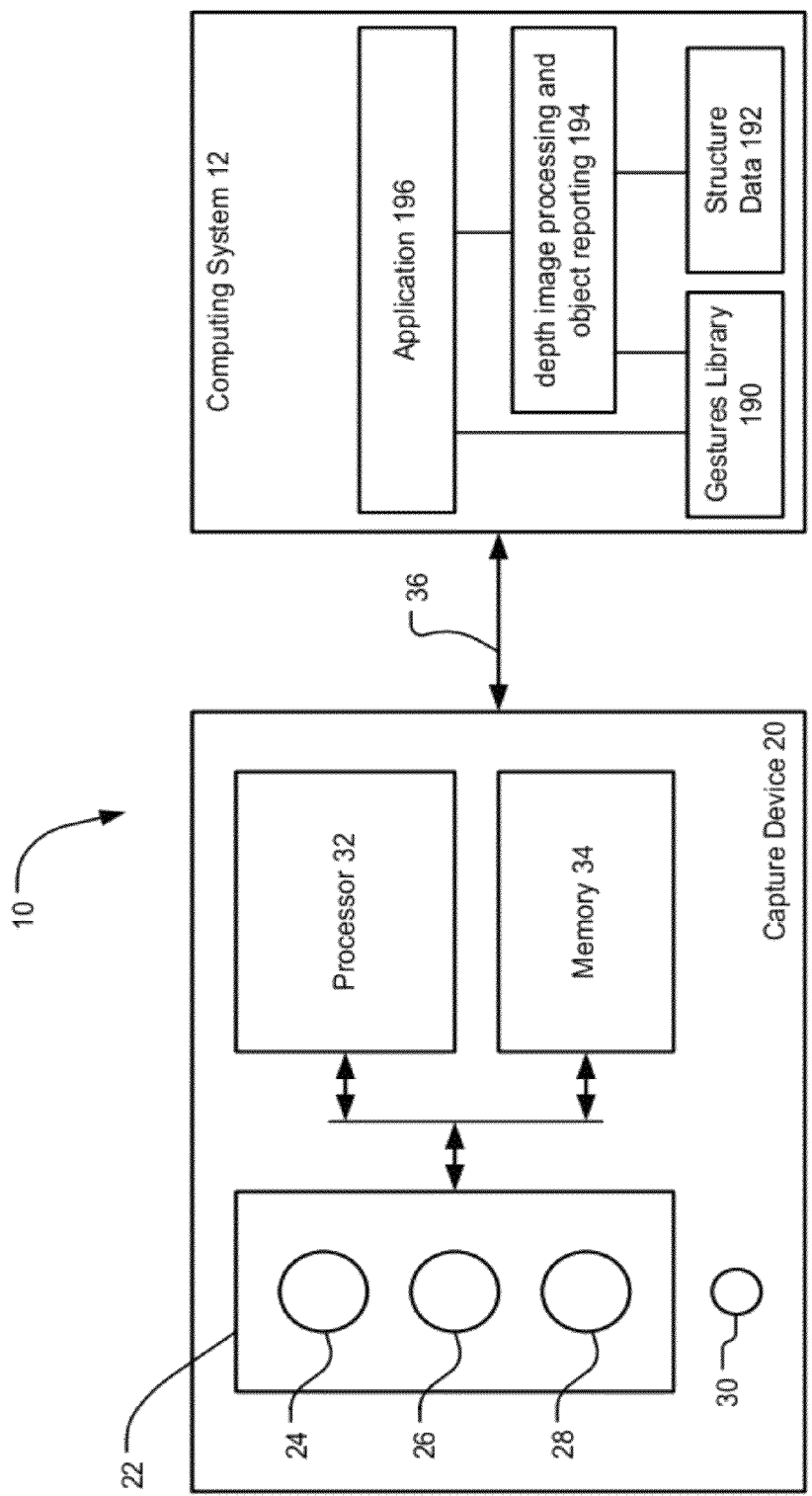
FIG. 2 illustrates an example embodiment of a capture device that may be used as part of the tracking system.

FIG. 2 illustrates an example embodiment of the capture device 20 that may be used in the tracking system 10. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

As shown in FIG. 2, according to an example embodiment, the image camera component 22 may include an infra-red (IR) light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern, a stripe pattern, or different pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device to a particular location on the targets or objects. In some implementations, the IR Light component 24 is displaced from the cameras 24 and 26 so triangulation can be used to determined distance from cameras 24 and 26. In some implementations, the capture device 20 will include a dedicated IR sensor to sense the IR light.

According to another embodiment, the capture device 20 may include two or more physically separated cameras that may view a scene from different angles to obtain visual stereo data that may be resolved to generate depth information. Other types of depth image sensors can also be used to create a depth image.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing system 12 in the target recognition, analysis, and tracking system 10. Additionally, the microphone 30 may be used to receive audio signals that may also be provided by the user to control applications such as game applications, non-game applications, or the like that may be executed by the computing system 12.

In an example embodiment, the capture device 20 may further include a processor 32 that may be in operative communication with the image camera component 22. The processor 32 may include a standardized processor, a specialized processor, a microprocessor, or the like that may execute instructions including, for example, instructions for receiving a depth image, generating the appropriate data format (e.g., frame) and transmitting the data to computing system 12.

The capture device 20 may further include a memory component 34 that may store the instructions that may be executed by the processor 32, images or frames of images captured by the 3-D camera and/or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22 and the processor 32. According to another embodiment, the memory component 34 may be integrated into the processor 32 and/or the image capture component 22.

As shown in FIG. 2, the capture device 20 may be in communication with the computing system 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing system 12 may provide a clock to the capture device 20 that may be used to determine when to capture, for example, a scene via the communication link 36. Additionally, the capture device 20 provides the depth information and visual (e.g., RGB) images captured by, for example, the 3-D camera 26 and/or the RGB camera 28 to the computing system 12 via the communication link 36. In one embodiment, the depth images and visual images are transmitted at 30 frames per second. The computing system 12 may then use the model, depth information, and captured images to, for example, control an application such as a game or word processor and/or animate an avatar or on-screen character.

Computing system 12 includes gestures library 190, structure data 192, depth image processing and object reporting module 194 and application 196. Depth image processing and object reporting module 194 uses the depth images to track motion of objects, such as the user and other objects. To assist in t he tracking of the objects, depth image processing and object reporting module 194 uses gestures library 190 and structure data 192.

Structure data 192 includes structural information about objects that may be tracked. For example, a skeletal model of a human may be stored to help understand movements of the user and recognize body parts. Structural information about inanimate objects may also be stored to help recognize those objects and help understand movement.

Gestures library 190 may include a collection of gesture filters, each comprising information concerning a gesture that may be performed by the skeletal model (as the user moves). The data captured by the cameras 26, 28 and the capture device 20 in the form of the skeletal model and movements associated with it may be compared to the gesture filters in the gesture library 190 to identify when a user (as represented by the skeletal model) has performed one or more gestures. Those gestures may be associated with various controls of an application. Thus, the computing system 12 may use the gestures library 190 to interpret movements of the skeletal model and to control application 196 based on the movements. As such, gestures library may be used by depth image processing and object reporting module 194 and application 196.

Application 196 can be a video game, productivity application, etc. In one embodiment, depth image processing and object reporting module 194 will report to application 196 an identification of each object detected and the location of the object for each frame. Applicant 196 will use that information to update the position or movement of an avatar or other images in the display.

Figure 3:
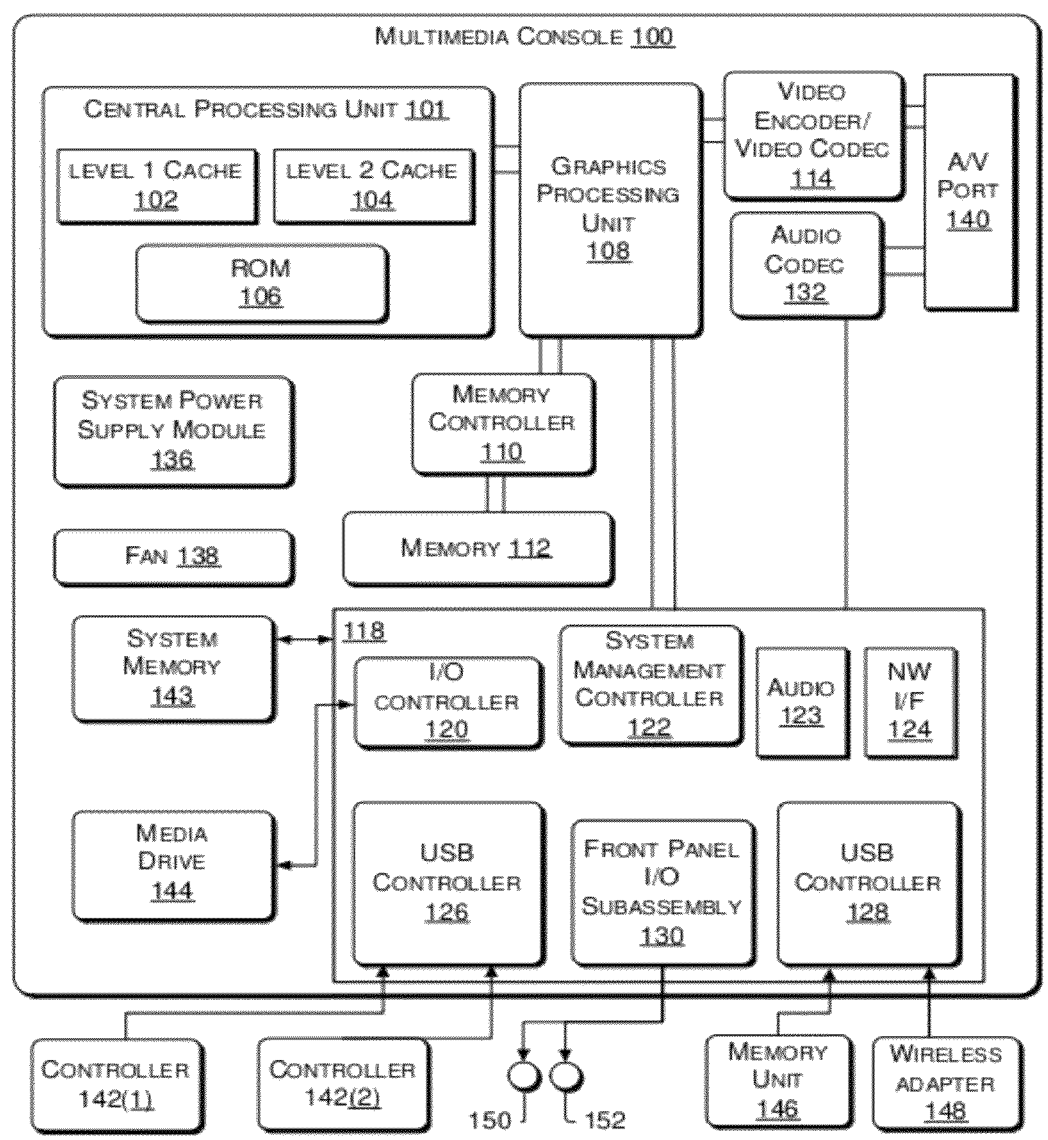
FIG. 3 illustrates an example embodiment of a computing system that may be used to track motion and update an application based on the tracked motion.

FIG. 3 illustrates an example embodiment of a computing system that may be the computing system 12 shown in FIGS.

1A-2 used to track motion and/or animate (or otherwise update) an avatar or other on-screen object displayed by an application. The computing system such as the computing system 12 described above with respect to FIGS. 1A-2 may be a multimedia console 100, such as a gaming console. As shown in FIG. 3, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, Blu-Ray drive, hard disk drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 20 may define additional input devices for the console 100 via USB controller 126 or other interface.

Figure 4:
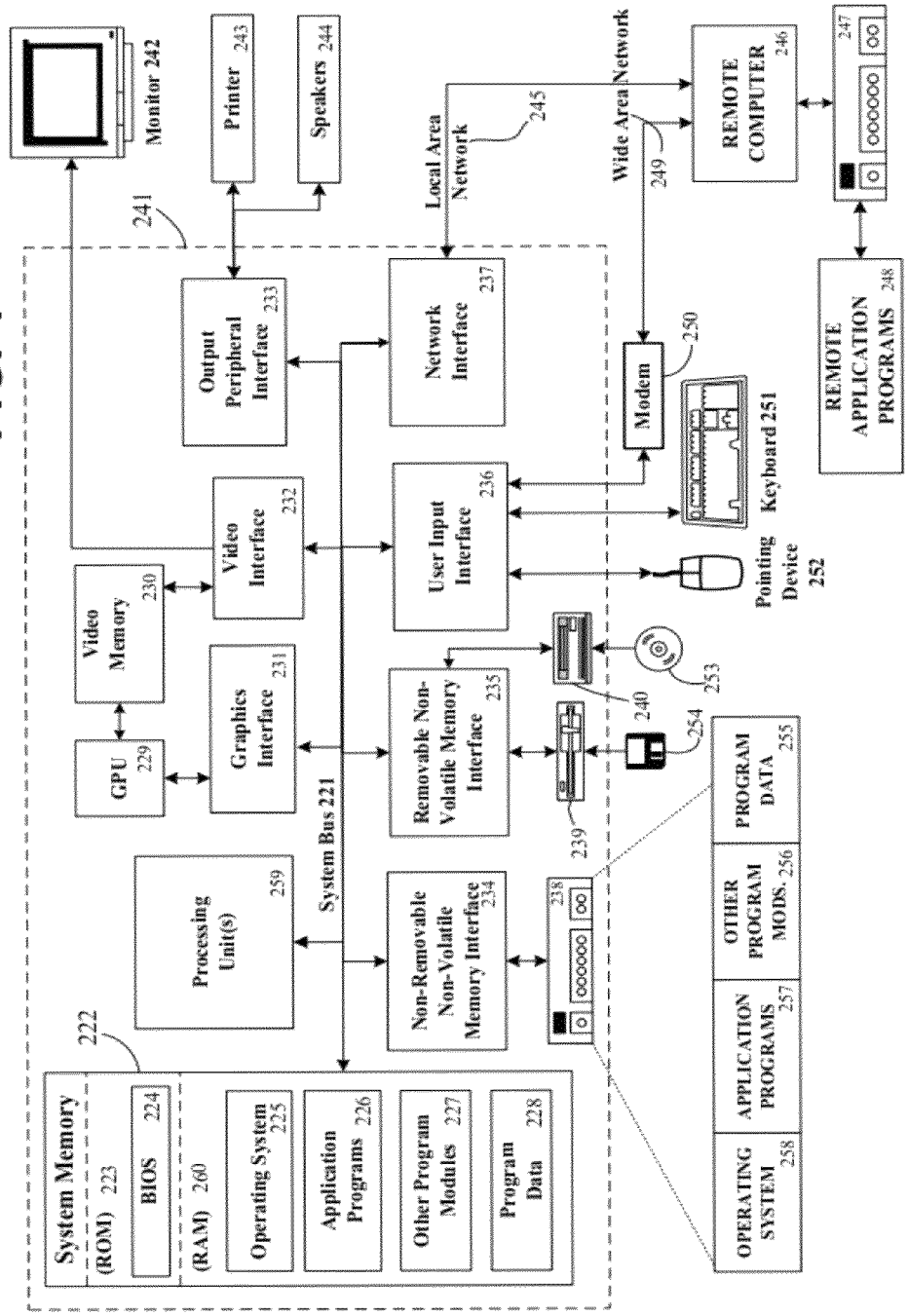
FIG. 4 illustrates another example embodiment of a computing system that may be used to track motion and update an application based on the tracked motion.

FIG. 4 illustrates another example embodiment of a computing system 220 that may be the computing system 12 shown in FIGS. 1A-2 used to track motion and/or animate (or otherwise update) an avatar or other on-screen object displayed by an application. The computing system environment 220 is only one example of a suitable computing system and is not intended to suggest any limitation as to the scope of use or functionality of the presently disclosed subject matter. Neither should the computing system 220 be interpreted as having any dependency or requirement relating to any one or combination of components illustrated in the exemplary operating system 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function (s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computing system 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4, provide storage of computer readable instructions, data structures, program modules and other data for the computer 241. In FIG. 4, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100 that connect via user input interface 236. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233. Capture Device 20 may connect to computing system 220 via output peripheral interface 233, network interface 237, or other interface.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4. The logical connections depicted include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 illustrates application programs 248 as residing on memory device 247. It will be appreciated that the network connections shown are exemplary and other means of establishing a communications link between the computers may be used.

As explained above, capture device 20 provides RGB images and depth images to computing system 12. The depth image may be a plurality of observed pixels where each observed pixel has an observed depth value. For example, the depth image may include a two-dimensional (2-D) pixel area of the captured scene where each pixel in the 2-D pixel area may have a depth value such as a length or distance in, for example, centimeters, millimeters, or the like of an object in the captured scene from the capture device.

Figure 5:
FIG. 5 is an example depth image.

FIG. 5 illustrates an example embodiment of a depth image that may be received at computing system 12 from capture device 20. According to an example embodiment, the depth image may be an image and/or frame of a scene captured by, for example, the 3-D camera 26 and/or the RGB camera 28 of the capture device 20 described above with respect to FIG. 2. As shown in FIG. 5, the depth image may include a human target corresponding to, for example, a user such as the user 18 described above with respect to FIGS. 1A and 1B and one or more non-human targets such as a wall, a table, a monitor, or the like in the captured scene. As described above, the depth image may include a plurality of observed pixels where each observed pixel has an observed depth value associated therewith. For example, the depth image 400 may include a two-dimensional (2-D) pixel area of the captured scene where each pixel at particular X-value and Y-value in the 2-D pixel area may have a depth value such as a length or distance in, for example, centimeters, millimeters, or the like of a target or object in the captured scene from the capture device.

In one embodiment, the depth image may be colorized or grayscale such that different colors or shades of the pixels of the depth image correspond to and/or visually depict different distances of the targets 404 from the capture device 20. Upon receiving the image, one or more high-variance and/or noisy depth values may be removed and/or smoothed from the depth image; portions of missing and/or removed depth information may be filled in and/or reconstructed; and/or any other suitable processing may be performed on the received depth image.

Figure 6:
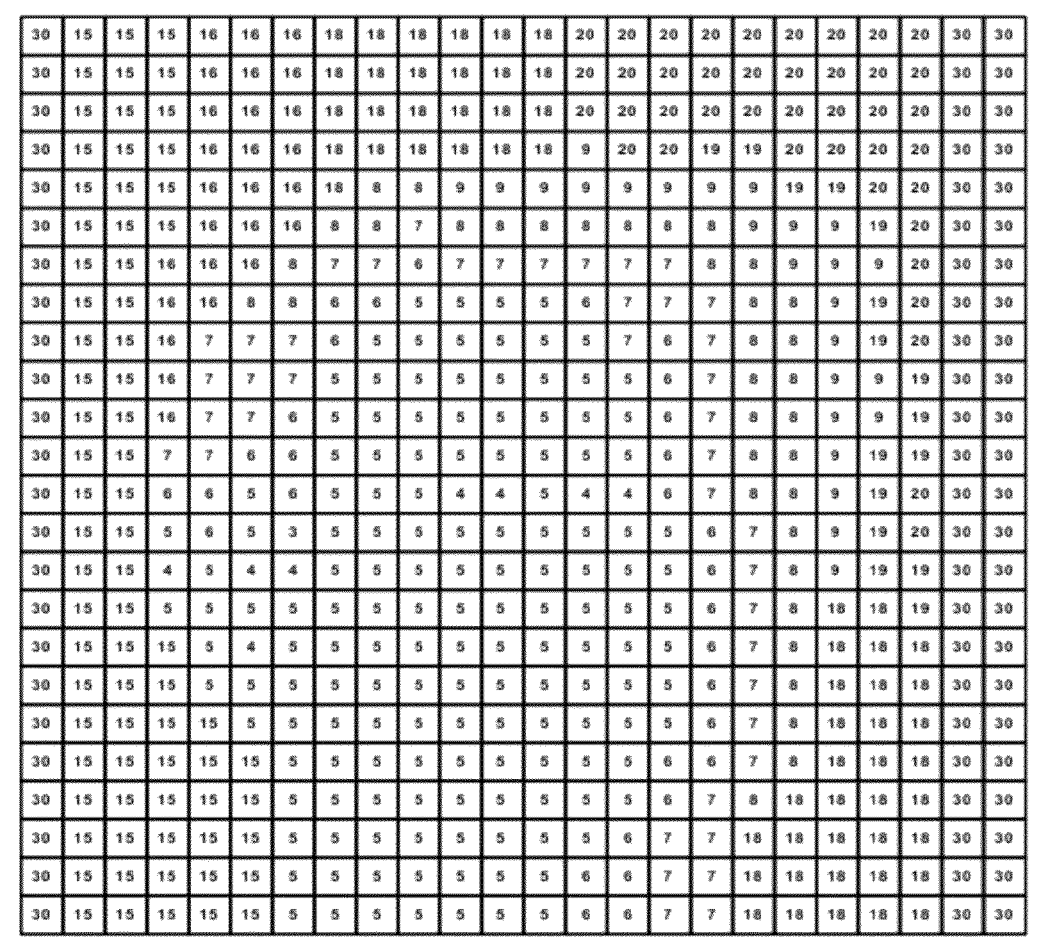

FIG. 6 provides another view/representation of a depth image (not corresponding to the same example as FIG. 5). The view of FIG. 6 shows the depth data for each pixel as an integer that represents the distance of the target to capture device 20 for that pixel. The example depth image of FIG. 6 shows 24×24 pixels; however, it is likely that a depth image of greater resolution would be used.

Figure 7:
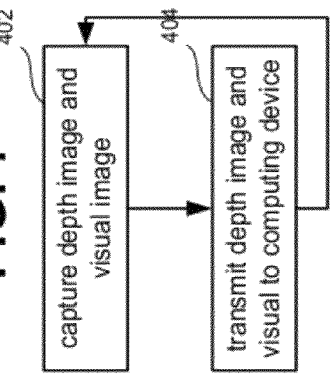
FIG. 7 is a flow chart describing one embodiment of a process for capturing a sequence depth images.

FIG. 7 is a flow chart describing one embodiment of a process for operating capture device 20. In step 402, a depth image and a visual image are captured by any of the sensors in capture device 20 described herein, or other suitable sensors known in the art. In one embodiment, the depth image is captured separately from the visual image. In some implementations, the depth image and visual image are captured at the same time, while in other implementations they are captured sequentially or at different times. In other embodiments, the depth image is captured with the visual image or combined with the visual image as one image file so that each pixel has an R value, a G value, a B value and a Z value (distance). In step 404, the depth image and the visual image are transmitted to computing system 12. In one embodiment, the depth image and visual image are transmitted at 30 frames per second. In some examples, the depth image is transmitted separately from the visual image. In other embodiments, the depth image and visual image can be transmitted together.

Figure 8:
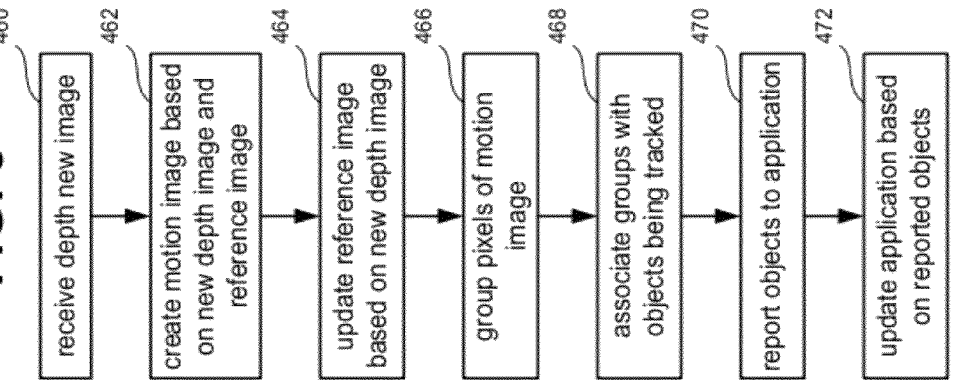
FIG. 8 is a flow chart describing one embodiment of a process for operating a computing system to track motion and update an application based on that tracked motion.

FIG. 8 is a flowchart describing one embodiment of a process for operating computing system 12 to use depth images to track and identify objects (users and other objects) in order to update an application based on the objects identified and tracked. The process of FIG. 8 is performed in response to capturing device 20 transmitting a depth image and visual image to computing system 12 (step 404 of FIG. 7); therefore, the process of FIG. 8 is performed many times. In one embodiment, the process of FIG. 8 is performed 30 times a second. In other embodiments, the process of FIG. 8 can be performed more or less than 30 times per second based on or independent from the frame rate of the depth images. In step 460 of FIG. 8, computing system 12 will receive a new depth image from capturing device 20 in response to step 404 of FIG. 7. This depth image is provided to the depth image processing and object reporting module 194.

In step 462 of FIG. 8, a motion image is created based on the newly received depth image and a reference image. The reference image is typically in the same format as the depth image. In one embodiment, the reference image as a single static image of a scene taken prior to the motion. In another embodiment, the reference image is a moving average of the most recent N frames of depth images which provides an estimate of the typical depth position for every pixel in the depth image sequence. If the reference image is a moving average, then the reference image will update over time. The average can either be a uniform average across the sequence length, an exponential decay average, or other weighted average using an external weighting system. Comparing the current depth image to the moving average allows the system to adapt to gradual changes in the scene, as well as automatically adapt to a moving capture device without a reinitialization step. In one embodiment, the reference image is based on 4 seconds of depth images; therefore, if the frame rate is 30 frames per second then the reference image is based on the most recent 120 depth images.

The reference image is updated based on each new depth image is received. In one example, it will take 120 frames before the reference image is established. In other embodiments, the reference image will be established with the first depth image and then each additional depth image will be added to the reference image until there are 120 depth images received, then the reference image will be updated by the most recent 120 images.

The Equation (1) below provides one example of a formula for creating a reference image:

$$\text{new average} = \frac{t*(\text{old average}) + \text{new data}}{t+1} \qquad \text{Equation (1)}$$

Equation (1) is used to operate on each pixel of the reference image. The variable "t" is the number of frames included in the reference image. In one example, 120 frames are included (4 seconds of video at 30 frames per second). The variable "old average" is the pixel value in the reference image for the particular pixel under consideration. The variable "new data" is the corresponding pixel value in the new depth image received. The output "new average" is the new pixel value of the updated reference image. Equation 1 is performed for every pixel of the reference image. In this manner, the reference image is re-created each time it is updated.

In one alternative, the value of t in Equation (1) can be different if the motion is backward versus forward. For a particular pixel, the value of t can be 120 if the motion is forward and the value of t can be 30 if the motion is backward.

When using Equation (1), the system does not need to keep a buffer of the previous 120 frames of depth images. Only the current new depth image needs to be stored in a buffer as well as the reference image. If the system used a straight averaging process, then a buffer would need to keep the last 120 frames of depth images.

Step 462 includes creating a motion image based on the new depth image received in step 460 and the reference image discussed above. As explained above, in one embodiment, the depth image and the reference image have the same number of pixels. The motion image created in step 462 is also a file (or other data structure) with the same number of pixels in the same format as the depth image and reference image. In one embodiment, the motion image is created by subtracting the new depth image from the reference image on a pixel by pixel basis. Thus, a corresponding pixel in the depth image is subtracted from the corresponding pixel in the reference image and the result is stored as the corresponding pixel the motion image.

If the pixel value in the new depth image is the same as the pixel value in the reference image, then there is no motion detected for the pixel. If the difference between the reference image and the new depth image is positive, then there is motion towards capture device 20. If the difference between the reference image and the depth image is negative, then there is motion away from the capture device 20.

In one embodiment, the process for creating the motion image will compare a threshold to the difference between the reference image and new depth image, on a pixel-by-pixel basis, so that small variations will not be detected as motion. Additionally, some embodiments will discard backward motion data (away from the camera) and only report forward motion (toward the camera). In some implementation, the system will track the magnitude of the motion (e.g., the difference between the reference image pixel and depth image pixel), while in other embodiments, the system will only store a Boolean value in the motion image to indicate whether there is motion or not.

FIG. 9 is a flowchart describing one embodiment or a process for creating a motion image based on the new depth image received and the reference image that includes subtracting pixels, using a threshold and discarding backward motion. Thus, the process of FIG. 9 is one example implementation of step 462 of FIG. 8. In step 500 of FIG. 9, the system will access a pixel that has not already been operated on in the depth image. In step 502, the system will access the corresponding pixel in the reference image. In step 504, the system will subtract the pixels by subtracting the pixel in the new depth image from the pixel in the reference image. If the resulting magnitude is negative, then a zero is inserted into the corresponding pixel in the motion image in step 514 because the system is discarding backward motion. If the difference in pixels was not negative, then in step 508 it is determined whether the difference is greater than a threshold (e.g. 2 centimeters per meter). If the difference is not greater than the threshold, then in step 514 a zero is added to the corresponding pixel in the motion image because the difference is not great enough to be classified as forward motion. This technique helps reduce noise. If the difference is greater than the threshold, then the system will conclude that there is motion if forward motion (e.g., toward the camera), and in step 510, the difference data is inserted in corresponding pixel in the motion image. In another embodiment, rather than adding the difference data, a Boolean value (e.g., 1) is added to the motion image in step 510. In step 512, it is determined whether there are more pixels in the depth image that need to be operated on. If there are no more pixels in the depth image to be operated on, then the process of FIG. 9 is complete. If there are more pixels in the depth image to operate on, the process moves back to step 500 and accesses the next pixel in the depth image that has not been operated on. At the end of the process of FIG. 9, the motion image is created and includes either a 1 or 0 at each pixel. A zero means no motion (or discarded backward motion). A 1 for a pixel value indicates that there was forward motion for that pixel.

Figure 10:
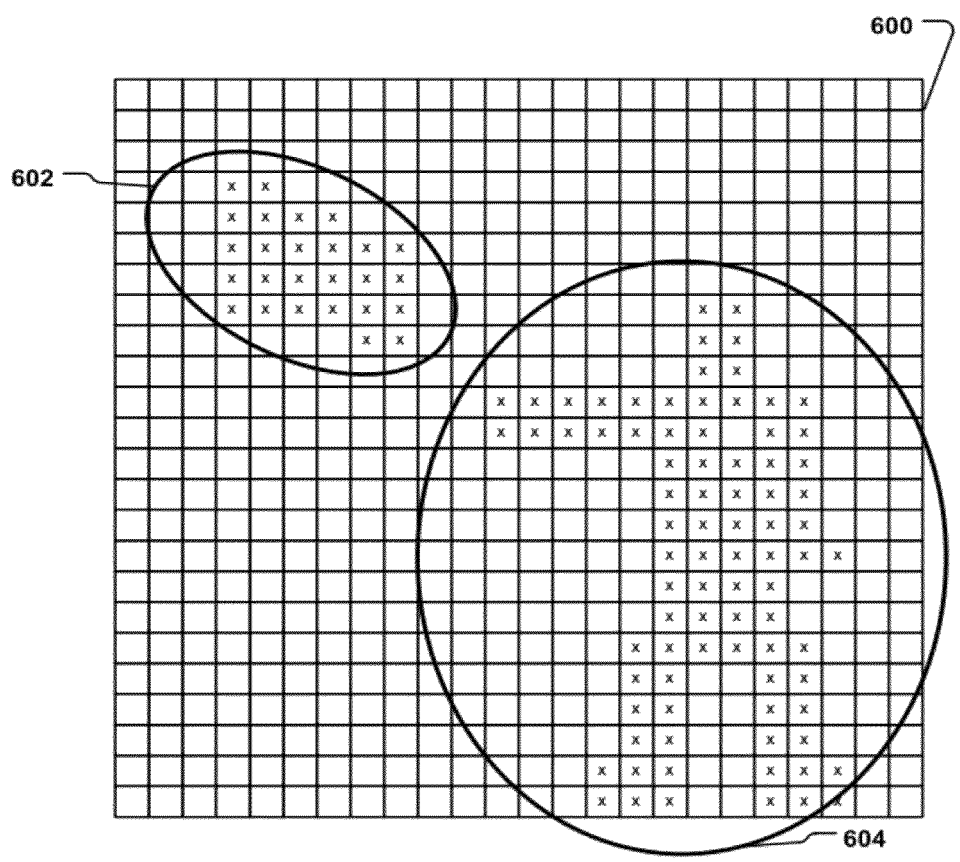
FIG. 10 is an example of a motion image.

FIG. 10 shows one example of a motion image created using the process of FIG. 9. As can be seen, some of the pixels have a data value 1 indicating that those pixels represent forward motion. The pixels for which there is no motion would have data zero; however, to make the drawing easier to read, the zeros have been left blank.

In the above discussion, the comparison between the newly received depth image and the reference image is a simple subtracting and thresholding of values. More sophisticated embodiments may use mean squared error, standard deviation, difference of means or other statistical measures to compare the two data sets. This comparison may be done at the image level, pixel level or some other intermediate granularity of the image.

In the above discussion, there was only one reference image that was maintained and compared against the newly received depth images. In other embodiments, the system can use more than one reference image. For example, the system can create and maintain two or more reference images that averaged the depth data over differing, or even randomized, time constants. Comparison against multiple reference images can increase likelihood that moving objects will be properly identified. In such an embodiment, the new depth image is compared against multiple reference images. Any motion detected from any other comparisons will be used to add a 1 to the appropriate pixel in the created motion image. Other schemes for comparing multiple reference images to a depth image can also be used.

Looking back at FIG. 8, after the motion image is created in step 462, the reference image is updated in step 464 based on the new depth image that was just received in the most recent iteration of step 460. As discussed above, in one embodiment, the reference image is a moving average of the most recent N frames of depth images. Since the new depth image is received, the average must move based on the newly received frame. Therefore, Equation (1) is used on each pixel of the reference image with "old average" being the data from the existing reference image and "new data" being the data from the newly received depth image. Equation (1) is performed for each pixel of the reference image to update the existing reference image to create a newly updated reference image in step 464.

Once regions of the depth image have been identified as moving, it is useful to segment them into individual groups and track their locations over time. If multiple objects are detected by the system, the output is a collection of pixels that have been identified as moving. To group these pixels into individual objects, the system can use a method of segmentation or grouping called connected component analysis. Neighboring pixels that are also identified as moving are considered connected and therefore part of the same group. Once all of the pixels have been accounted for, the result is a set of groups that represent potential moving objects in the scene. Alternative methods determining which pixels of part of the same group can also be used such as thresholding Euclidian 3D distance or surface distance. Another alternative is to use clustering methods where a fixed number of groups are hypothesized, pixels are associated with each hypothetical group, and then the overall hypothesis is scored based on how well it explained the data. Another method is to maintain the probability that a pixel belongs to each possible group rather than directly associating it with a single group. This may be valuable in scenarios where the tracking system that maintains group assignment between frames can handle ambiguity in pixel association making it more robust in some application scenarios.

Figure 11:
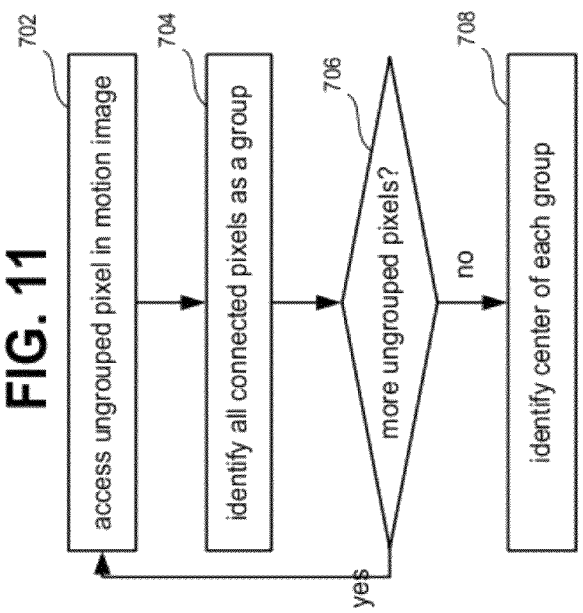
FIG. 11 is a flow chart describing one embodiment of a process for grouping pixels of a motion image.

Looking back at FIG. 8, step 466 of FIG. 8 includes grouping the pixels of the motion image that represent motion (e.g., store data 1). In one embodiment, the pixels are grouped based on proximity to each other. FIG. 11 is a flowchart describing one embodiment of a process for grouping pixels of motion image based on proximity. Thus, FIG. 8 is one example implementation of step 466 of FIG. 8. In step 702, the system will access an ungrouped pixel in the motion image that indicates motion (e.g., has data 1). In step 704, the system will identify all connected pixels that include the pixel accessed in step 702 as one group. For example, if a pixel has the data 1, the system looks for all pixels that neighbor that pixel that are also data 1, and of those neighbors with data 1, the system will look for all their neighboring pixels that also have data 1, and so on, until all connected contiguous and continuous pixels showing data 1 are grouped into a group. Then in step 706, the system determines whether there are any ungrouped pixels that have not been considered yet. If so, the process moves back to step 702 and accesses another ungrouped pixel and attempts to find connected pixels. If, in step 706, it is determined that there are no more ungrouped pixels, then in step 708, the system will identify the center of each group. When step 708 is performed, each of the pixels is in a group. It is possible that some groups will only have one pixel. For groups that have more than one pixel, the system will determine the geometric center of the group and identify the x and y coordinate (in pixel space) of that group. Note that FIG. 10 shows the motion image with the pixels grouped. For example, a first set of pixels are grouped as depicted by oval 602 and a second set of pixels are grouped as depicted by oval 604.

Groups containing a small number of pixels may be the result of noise in the depth image that exceeds the threshold limit in the motion detection step. To further filter out interference from noise, one embodiment may require a minimum pixel count or minimum physical size of a group to perform further motion analysis.

Looking back at FIG. 8, after the pixels of the motion image are grouped in step 466, the groups are associated with objects being tracked in step 468. It is often valuable to track those objects over time and build an understanding that a moving object in one image is the same object in the following image. In one embodiment, the system will create object history data which stores information about the motion of objects being tracked. For example, this object history data can store an identification of all of the various objects being tracked and prior positions of the objects in the motion image. There are many methods for tracking the objects that can be used. No one particular method for tracking is required. In one example, a spatial likelihood tracking approach can be used that records the positions of each object over time and reassociates new motion with whatever object it is most likely to be. One example is to associate movement with the closest identified object in the previous image in the sequence. Alternative embodiments include predicting the trajectory of the moving object based on recent movements. The system can also model movement when the object is known to be a subcomponent of a larger object, such as an arm or a larger body.

Figure 12:
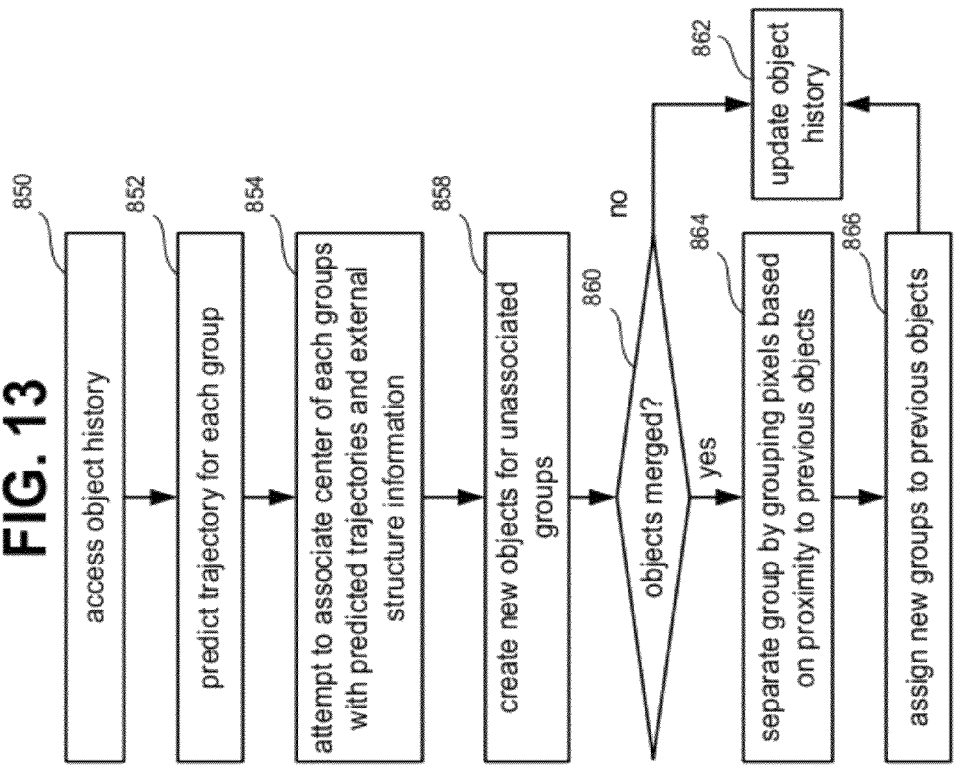
FIG. 12 is a flow chart describing one embodiment of a process for associating groups of pixels in a motion image with objects being tracked.
Figure 13:
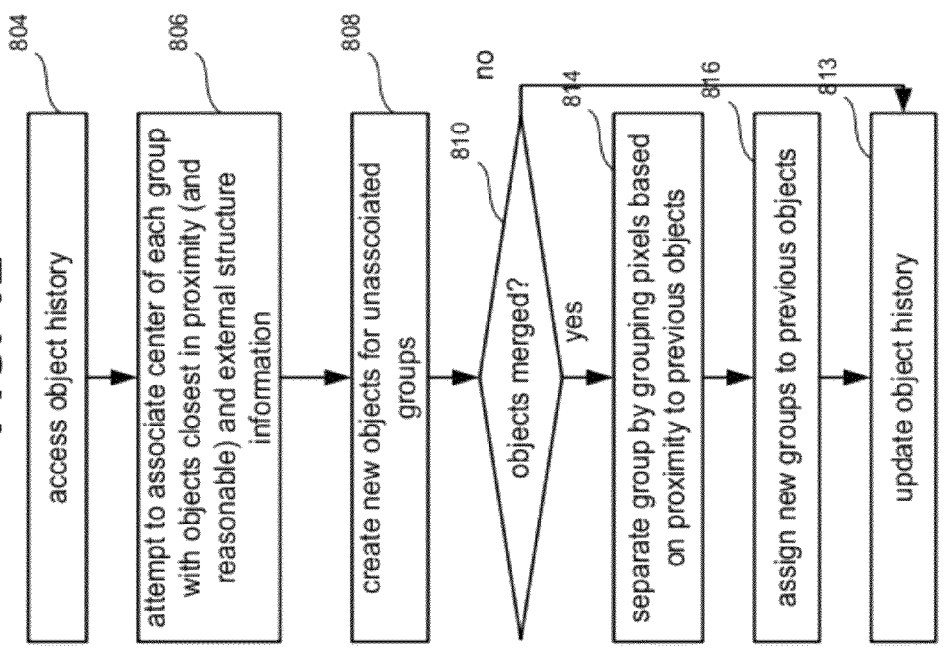
FIG. 13 is a flow chart describing another embodiment of a process for associating groups of pixels in a motion image with objects being tracked.

FIGS. 12 and 13 provide two embodiments of processes for associating groups of pixels in the motion image with objects being tracked (step 468 of FIG. 8). The process of FIG. 12 associates groups of pixels with objects by associating a group with the closest identified object in the previous image in the sequence. In step 804 of FIG. 12, the system will access the object history data discussed above. Thus, the system will have information about all the objects previously tracked and their positions in the previous motion images. The object history data can be stored in any suitable type of data structure. In step 806, the system will attempt to associate the center of each group in the current motion image with the object of closest proximity in the most recent motion image. In some embodiments, there will be a threshold distance so that the association must be reasonable. For example, if the closest object is halfway across the image, that may not be a reasonable association and will be discarded. The particular threshold used for the association will vary based on implementation and experimentation.

In some embodiments, the depth image process and client reporting module 194 performing the association of step 840 will make use of the information in gestures library 190 or a structure data 192 to associate groups with objects. For example, based on known shapes, the system can correlate a group with an existing object. If an object being tracked is a person, external structure data can be used to identify the shape of a person which will help the system better associate a group of pixels in the motion image with the person. Additionally, if the system knows it has previously been tracking a person with an arm moving, the external structure data 192 and the gestures library 190 could teach the system about probable movement of an arm, leg or other body part so the system can more readily identify the object. Similarly, the system may be able to recognize an inanimate object such as a ball or tennis racket based on references or templates in structure data 192.

Step 806 attempts to assign every group to an object being tracked. In some embodiments, some groups may not be assignable. In one embodiment, any group that cannot be assigned to an object will be assumed to be a new object. In step 808, any unassociated groups have new objects created and these unassociated groups are assigned to the new objects.

If moving objects come into close proximity to each other they may appear to merge into a single region. In some applications, it may be desirable to try to separate the single region back into the individual objects based on previous observation. One embodiment includes segmenting the pixels based on their proximity to the center of the previous objects. Pixels are associated with whatever previous objects they were closest to. The distance metric may be as simple as Euclidian distance, surface distance or other representation of distance.

In step 810, the system determines whether two objects from a previous motion image have merged in the current motion image. That is, if there are two objects in the previous motion image and the current image has only one object in a similar or proximal location as the two objects in the previous image, the system can determine that the two objects have merged. If the system determines that there have not been objects that have merged, then the process continues at step 812 and the object history data discussed above is updated so that all groups in the current motion image have their center coordinates (x,y) used to update the position of the objects being tracked. If, in step 810, the system determines that the two objects have merged, then the objects are separated by grouping the pixels based on proximity to the separate objects in the previous motion images in step 814. In step 816, the separated groups are assigned to the appropriate objects from the previous motion image. In step 812, after step 816, the objects history data is updated so that all groups in the current motion image have their center coordinates (x,y) used to update the position of the objects being tracked.

FIG. 13 is another embodiment of associating groups to objects (step 468 of FIG. 8) that is based on predicting the trajectory of moving objects using the object history data. In step 850 of FIG. 13, the system will access the object history data discussed above. In step 852, using that data, the system can predict the trajectory for each object being tracked. The system knows the x and y coordinates in the motion images for previous positions of the object. This data can be used to determine a trajectory and predict where those objects should be in the current motion image. In step 854, the system attempts to associate the center of each of the groups in the current image with the predicted trajectories. The system can also use the structure data 192 and gesture library 190 discussed above to predict the trajectories. In step 858, any object that was not associated in step 854 is assigned to be a new object in step 858. In step 860, the system determines whether two objects have merged, as discussed above. If no objects have merged, then the object history data is updated in step 862 to include the information from the current motion image. If two objects have merged (step 860), then in step 864 those groups are separated as discussed above with respect to step 814. In step 866, the newly separated groups are assigned to the previous objects (same as step 816). In step 862, the object history data is updated, as discussed above.

Looking back at FIG. 8, after associating the groups with objects being tracked the information about the objects is reported to the application in step 470. In one example embodiment, steps 460-470 are performed by depth image processing and object reporting module 194. In step 470, depth image processing and object reporting module 194 reports to application 196 an identification of all the objects it is tracking and the (X, Y) positions of each of those objects in the current motion image. In step 472, application 196 will update based on the reported object information from step 470. The tracking of the objects can be mapped directly to cursor control, where moving along the perpendicular plane defines the two dimensional position of the cursor and movement and depth can trigger other events. In such an embodiment, step 470 would also include reporting depth (distance) information for each object. For example, the depth values for all the pixels in the group associated with the object can be averaged and that data can be the depth number reported for the particular object. Alternatively, all of the depth values can be reported to the application or the depth value for the center of each group can be reported.

In other embodiments, each object can correlate to an image being displayed on a monitor as part of a video game or other software application. When any of the objects move, application 196 will update the positions of the images on the monitor for the object that moved. For example, if a person moves, the person's avatar in the video game may move. If person throws the ball, an image of the ball may move in the video game. There are many different ways an application can update itself based on the motion of the tracked objects. No particular way for updating the application is required for the technology described herein.

The object history data may also incorporate information about neighboring objects or the structure of a larger object provided by an external system (e.g. structure data 192). For example, if a moving object is identified to be the left arm of a human body or a human head, the system can infer that a certain set of pixels pertains to the left hand. Other variations can also be implemented.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A method for using depth images to sense motion, comprising:

creating a reference image;

receiving a new depth image;

creating a motion image based on the new depth image and the reference image, wherein the motion image represents identified forward motion;

identifying one or more objects in the motion image;

using position information for the identified one or more objects to update an application; and updating the reference image based on the new depth image.

2. The method of claim 1, wherein:

the creating the motion image includes subtracting the new depth image from the reference image to create a set of difference data, identifying difference data greater than a threshold as motion data that includes forward motion data and backward motion data, and discarding the backward motion data.

3. The method of claim 1, wherein:

the identifying one or more objects in the motion image includes grouping pixels of the motion image to form one or more groups of pixels, associating each of the one or more groups of pixels with one or more objects identified in object history data, and updating the object history data; and the using position information for the identified one or more objects to update the application includes reporting the one or more objects and positions for the one or more objects to the application.

4. The method of claim 3, wherein:

the grouping of pixels is based on identifying connecting pixels.

5. The method of claim 3, wherein:

the grouping of pixels is based on proximity to previously identified objects.

6. The method of claim 1, wherein:

the reference image is created based on multiple previous depth images and is in a same format as the multiple previous depth images; and the reference image is a moving average of the most recent N frames of depth images.

7. The method of claim 1, wherein:

the identifying one or more objects in the motion image includes grouping pixels of the motion image to an initial group of pixels, determining that the initial group of pixels represents two objects, splitting the initial group of pixels into a first group of pixels and a second group of pixels, associating the first group of pixels with a first object based on object history data, and associating the second group of pixels with a second object based on object history data.

8. The method of claim 1, wherein:
the identifying one or more objects in the motion image includes grouping pixels of the motion image to form two or more groups of pixels, predicting a trajectory of an object and identifying the group of pixels closest to the predicted trajectory.

9. The method of claim 1, wherein:
the new depth image and the reference image are two dimensional arrangements of pixels of a common captured scene where the pixels represent depth of the one or more objects.

10. The method of claim 1, wherein:
the new depth image includes a two dimensional arrangements of pixels, the pixels represent depth of the one or more objects.

11. The method of claim 1, wherein:
the using position information for the identified one or more objects to update the application includes changing the position of an image in a video display in response to the position information.

12. The method of claim 1, wherein:
the reference image is created based on a mathematical function of multiple previous depth images of a first object moving in a scene;
the received new depth image also portrays the first object moving in the scene;
the identifying one or more objects in the motion image includes identifying the first object in the scene; and
the position information includes position information for the first object in the scene.

13. An apparatus that uses depth images to sense motion, comprising:
a communication interface that receives depth images;
one or more storage devices that store depth images;
a display interface; and
one or more processors in communication with the one or more storage devices and the display interface, the one or more processors access a new depth image received from the communication interface and identify motion based comparing the new depth image to a reference depth image stored in the one or more storage devices, the one or more processors create a motion image representing identified motion, the one or more processors group pixels of the motion image and associate one or more groups of pixels with one or more objects identified in object history data stored in the one or more storage devices, the one or more processors use position information for the identified one or more objects to update an application running on the apparatus and provide signals on the display interface that indicate the update to the application, the new depth image and the reference depth image are two dimensional arrangements of pixels of a common captured scene where the pixels represent depth of the one or more objects.

14. The apparatus of claim 13, wherein:
the display interface connects to a video monitor;
the one or more processors use the position information for the identified one or more objects to update a position of an image on the video monitor; and
the image is displayed by the application.

15. The apparatus of claim 13, wherein:
the reference depth image includes foreground and background data based on multiple previous depth images.

16. The apparatus of claim 13, wherein:
the one or more processors determine that a particular group of pixels represents two objects, split the particular group of pixels into a first group of pixels and a second group of pixels, associate the first group of pixels with a first object based on object history data, and associate the second group of pixels with a second object based on object history data.

17. The apparatus of claim 13, wherein:
the one or more processors also use structure information about items in real space in order to associate the one or more groups of pixels with the one or more objects.

18. A method for using depth images to sense motion, comprising:
receiving a new depth image;
identifying motion based on comparing the new depth image to a reference image;
creating a motion image representing identified forward motion, and discarding identified backward motion when creating the motion image;
identifying one or more objects in the motion image; and
reporting the identified one or more objects in the motion image.

19. The method of claim 18, further comprising:
creating the reference image that includes foreground data and background data based on multiple previous depth images.

20. The method of claim 18, wherein:
the reporting the identified one or more objects includes reporting objects and positions of the objects to an application that uses the position to create video.

* * * * *

UNITED STATES PATENT AND TRADEMARK OFFICE
CERTIFICATE OF CORRECTION

| | | |
|---|---|---|
| PATENT NO. | : 8,374,423 B2 | Page 1 of 1 |
| APPLICATION NO. | : 13/410546 | |
| DATED | : February 12, 2013 | |
| INVENTOR(S) | : Lee et al. | |

It is certified that error appears in the above-identified patent and that said Letters Patent is hereby corrected as shown below:

In the Drawings

In Drawing, Sheet 11 of 11, Fig. 12, Reference Numeral 808, line 1, delete "unasscoiated" and insert -- unassociated --, therefor.

In the Specification

Column 6, line 35, delete "t he" and insert -- the --, therefor.

Signed and Sealed this
Tenth Day of February, 2015

Michelle K. Lee
*Deputy Director of the United States Patent and Trademark Office*